(12) United States Patent
Enders

(10) Patent No.: US 7,758,069 B2
(45) Date of Patent: Jul. 20, 2010

(54) KNEE AIRBAG AND RESTRAINT SYSTEM FOR SUPPRESSING DEPLOYMENT OF HEAD/TORSO AIRBAG

(75) Inventor: Mark L. Enders, Pleasant View, UT (US)

(73) Assignee: Autoliv ASP, Inc., Ogden, UT (US)

( * ) Notice: Subject to any disclaimer, the term of this patent is extended or adjusted under 35 U.S.C. 154(b) by 801 days.

(21) Appl. No.: 11/436,708

(22) Filed: May 18, 2006

(65) Prior Publication Data
US 2007/0267852 A1 Nov. 22, 2007

(51) Int. Cl.
*B60R 21/205* (2006.01)
(52) U.S. Cl. .................... 280/732; 280/730.1
(58) Field of Classification Search ............ 280/730.1, 280/729, 732, 735
See application file for complete search history.

(56) References Cited
U.S. PATENT DOCUMENTS

| | | | | |
|---|---|---|---|---|
| 3,610,657 A | * | 10/1971 | Cole | 280/729 |
| 3,617,073 A | * | 11/1971 | Landsman et al. | 280/734 |
| 4,290,627 A | | 9/1981 | Cumming et al. | 280/729 |
| 5,333,899 A | * | 8/1994 | Witte | 280/730.2 |
| 5,513,877 A | | 5/1996 | MacBrien et al. | 280/732 |
| 6,139,052 A | * | 10/2000 | Preamprasitchai | 280/735 |
| 6,270,112 B1 | | 8/2001 | Bowers | 280/728.3 |
| 6,431,583 B1 | * | 8/2002 | Schneider | 280/728.2 |
| 6,431,586 B1 | * | 8/2002 | Eyrainer et al. | 280/730.1 |
| 6,733,036 B2 | * | 5/2004 | Breed et al. | 280/735 |
| 2003/0116945 A1 | * | 6/2003 | Abe | 280/729 |
| 2005/0029781 A1 | * | 2/2005 | Enders et al. | 280/732 |

FOREIGN PATENT DOCUMENTS

DE 19946477 3/2001

* cited by examiner

*Primary Examiner*—Paul N. Dickson
*Assistant Examiner*—Timothy Wilhelm
(74) *Attorney, Agent, or Firm*—Sally J Brown; Stoel Rives, LLP

(57) ABSTRACT

A restraint system that evaluates factors such the type of collision an automotive vehicle is experiencing and then, based on that evaluation, deploys a knee airbag and/or a head/torso airbag. A knee airbag is also disclosed with an upper portion and a lower portion.

10 Claims, 10 Drawing Sheets

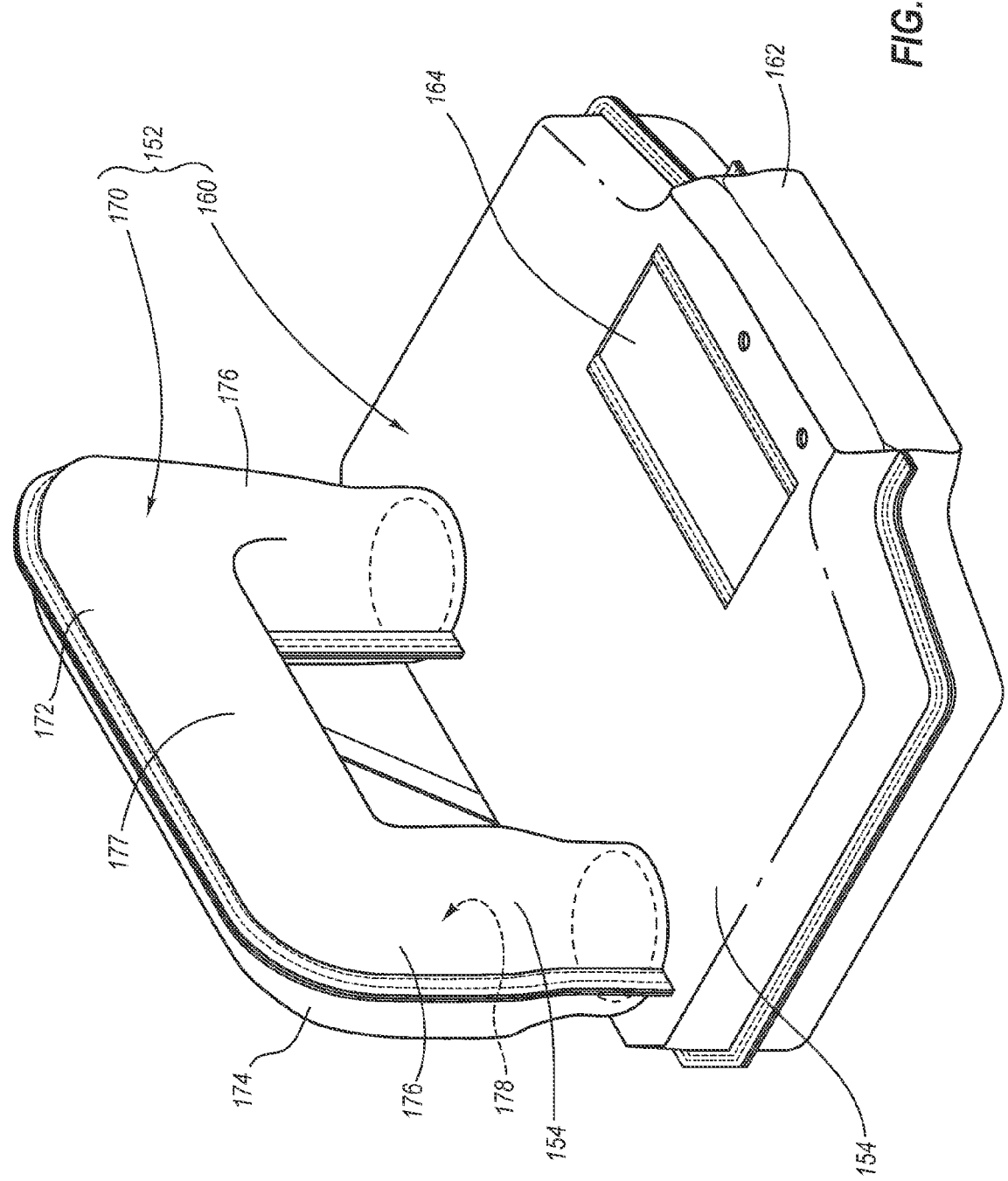

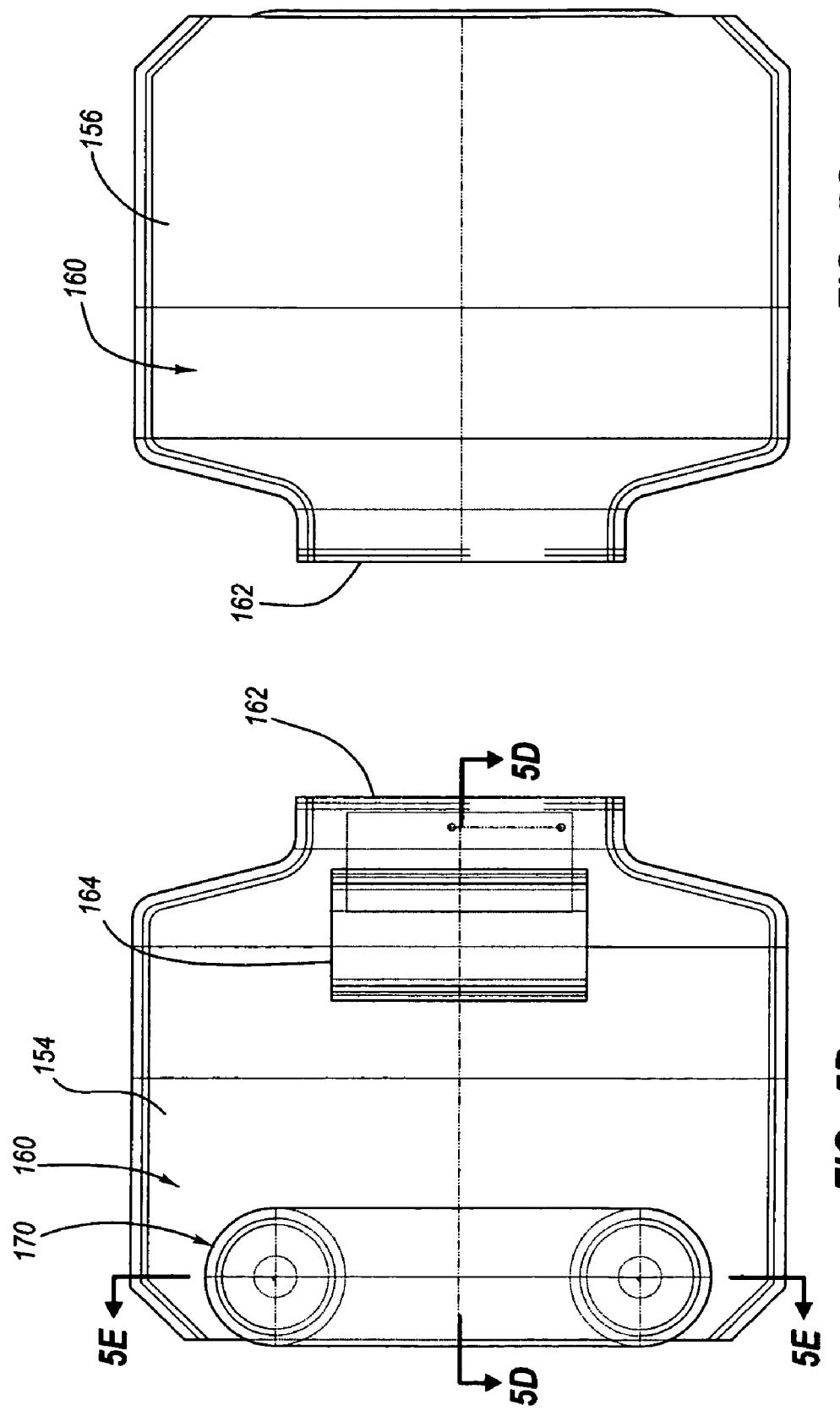

US 7,758,069 B2

KNEE AIRBAG AND RESTRAINT SYSTEM FOR SUPPRESSING DEPLOYMENT OF HEAD/TORSO AIRBAG

TECHNICAL FIELD

The present invention relates generally to the field of automotive protective systems. More specifically, the present invention relates to a restraint system for selective deployment of a knee air bag and passenger air bag based on various scenarios such as low-speed automotive collisions, restraining a small passenger, or restraining a passenger who is out-of-position.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments of the invention and are, therefore, not meant to limit the scope of the invention, the embodiments will be described and explained with specificity and detail through use of the accompanying drawings as listed below.

FIG. 5A is a perspective view of a knee airbag.

FIG. 5B is a plan view of the back of the knee airbag shown in FIG. 5A.

FIG. 5C is a plan view of he front of the knee airbag shown in FIG. 5A.

DETAILED DESCRIPTION OF PREFERRED EMBODIMENTS

It will be readily understood that the components of the embodiments as generally described and illustrated in the Figures herein could be arranged and designed in a wide variety of different configurations. Thus the following more detailed description of various embodiments, as represented in the Figures, is not intended to limit the scope of the invention as claimed, but is merely representative of various embodiments of the invention. In addition, in some cases, well-known structures, materials, or operations are not shown or described in detail in order to avoid obscuring aspects of the invention. Furthermore, the described features, structures, or characteristics may be combined in any suitable manner in one or more embodiments.

The word "exemplary" and the term "for example" are used herein to mean "serving as an example, for instance, or illustration." Any embodiment described herein as "exemplary" or "for example" is not necessarily to be construed as preferred or advantageous over other embodiments. Although various aspects of the embodiments are presented in drawings, the drawings are not necessarily drawn to scale unless specifically indicated.

Figure 1B:
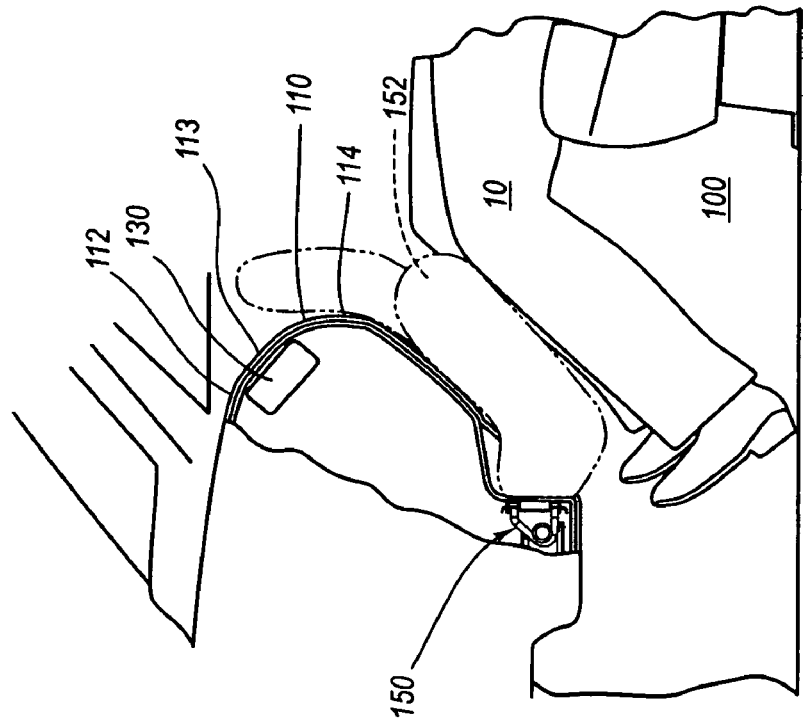
FIG. 1B is a partially broken away, pictorial view of an automotive vehicle which includes a head/torso airbag and a knee airbag. The view shows a passenger seated and the deployed knee air bag in phantom.
Figure 1A:
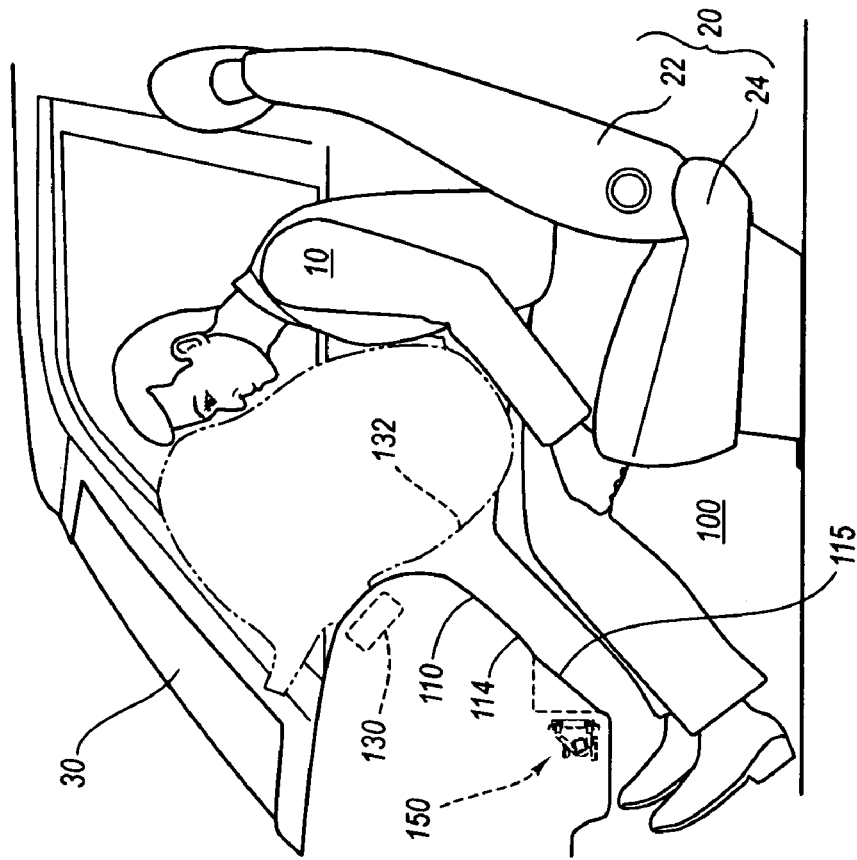
FIG. 1A is a partially broken away, pictorial view of an automotive vehicle which includes a head/torso airbag and a knee airbag. The view shows a passenger seated and the deployed head/torso airbag in phantom.

FIGS. 1A-1B depict a front-seat passenger 10 in an automotive vehicle 100 having an exemplary passenger restraint system for protecting the front-seat passenger 10 during a collision. Instrument panel 110 is shown in a cross-sectional view containing a head/torso airbag apparatus 130 and a knee airbag apparatus 150. Head/torso airbag apparatus 130, also known as a passenger airbag apparatus, has a head/torso airbag 132 which is shown in its stored position in FIGS. 1A-1B. FIG. 1A also shows the position of head torso/airbag 132 in phantom. Similarly, knee airbag apparatus 150 has a knee airbag 152 which is shown in its stored position in FIG. 1A and in its deployed position via the phantom lines in FIG. 1B. The airbags or inflatable restraint cushions disclosed herein can be formed from any material which is used for airbags.

Head/torso airbag apparatus 130 helps prevent contact between passenger 10 and instrument panel 110 during a collision. Instrument panel 110 is positioned forwardly of a vehicle seat 20 which includes a seat back 22 and a seat cushion 24. Instrument panel 110 includes an upper surface 112 facing windshield 30 and a front surface 114 facing passenger 10. Instrument panel 110, which is of known construction, may include a metal or plastic substrate that supports a trim pad or cover. Head/torso airbag 132 inflates into the vehicle passenger compartment through a tear seam 113 or other deployment opening in the laminate which comprises instrument panel 110. Similarly, knee airbag 152 inflates through a tear seam 115 or other deployment opening in instrument panel 110. An exemplary airbag apparatus comprises an inflator, activation circuit, sensor, and a controller.

The force that is needed to open tear seam 113 comes from the initial pressurization of head/torso airbag 132 by an inflator (not shown). Upon activation, the inflator produces inflation fluid under pressure and directs the inflation fluid into head/torso airbag 132. The increased pressure causes head/torso airbag 132 to inflate outward against tear seam 113. Head/torso airbag 132 may be initially pressurized beyond the amount required to inflate it through tear seam 113. After inflating head/torso airbag 132 with sufficient pressure to push open the tear seam 113 and to enable movement of head/torso airbag 132 through tear seam 113, head/torso airbag 132 moves into a fully inflated position (shown in dashed lines in FIG. 1A) in the vehicle passenger compartment. In this way, head/torso airbag 132 is moved from its stored position to its inflated position between passenger 10, instrument panel 110 and windshield 30.

In the exemplary embodiment of knee airbag apparatus 150 shown in FIG. 1B, knee airbag apparatus 150 is mounted in a lower portion of vehicle instrument panel 110. Knee airbag 152 is shown in its stored position in FIG. 1A and its inflated position via the phantom lines in FIG. 1B. When in its inflated position, knee airbag 152 is positioned generally between instrument panel 110 and the passenger's knees and shins. More detailed information about the structure and the sequential movement of knee airbag apparatus 150 is provided below with reference to FIGS. 4A-4D and FIGS. 5A-5E.

Figure 2:
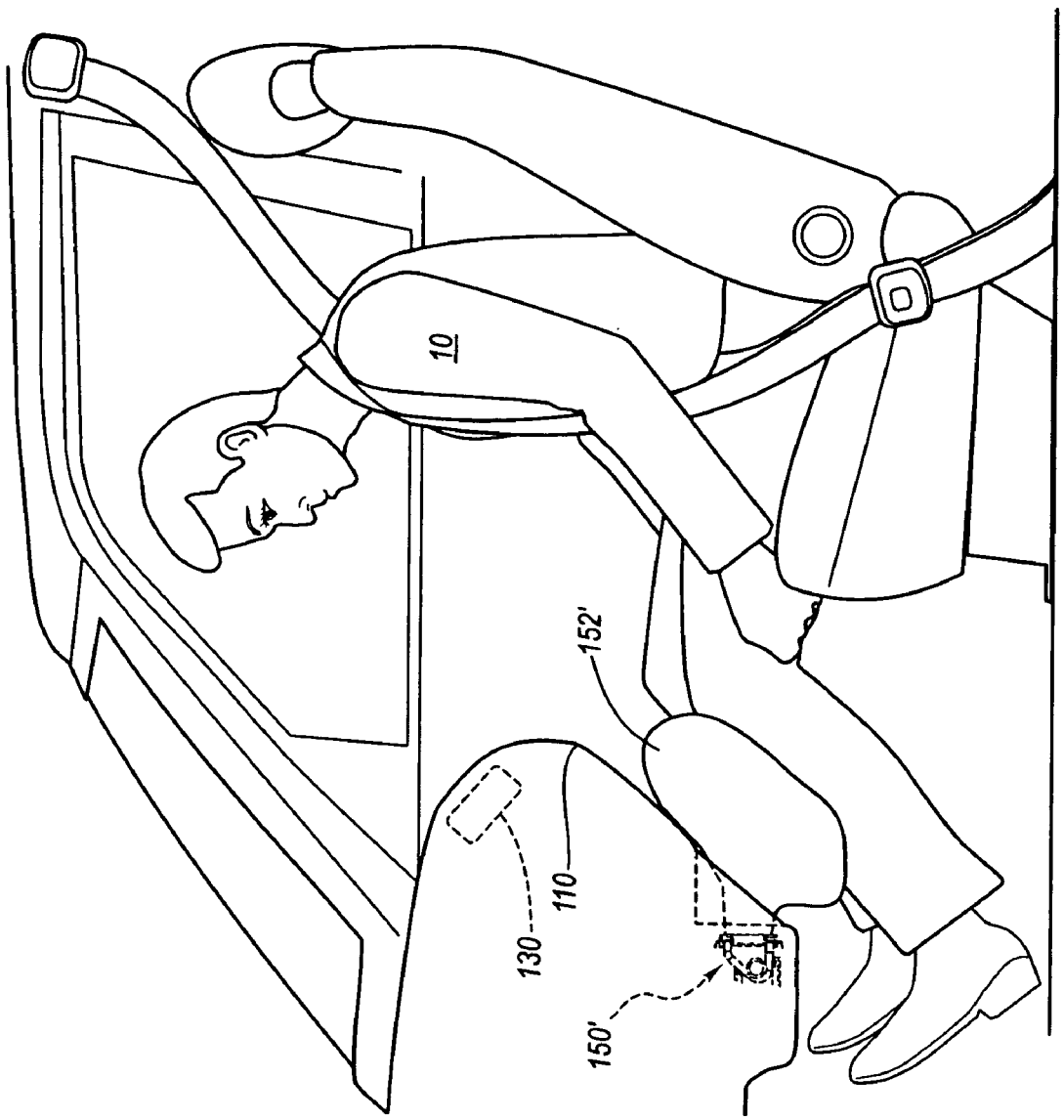
FIG. 2 is a partially broken away, pictorial view of an automotive vehicle which includes a head/torso airbag and another embodiment of a knee airbag. The view shows a passenger seated and the deployed knee air bag.

FIG. 2 depicts a conventional knee airbag apparatus 150'. Of course, other alternative embodiments of a knee airbag apparatus may be utilized. Knee airbag apparatus 150' comprises a knee airbag 152' which has a single chamber. Such a knee airbag, that does not protect the passenger's head or torso regions, may be used, in some embodiments, in conjunction with the deployment of a head/torso airbag. Note that the restraint systems are shown with reference to a passenger, however, the selective deployment enabled by the restraint systems disclosed herein also permit their use with the driver's side.

A conventional head/torso airbag such as the passenger airbag shown at 132 is typically a large airbag having between about 110 and 140 liters of volumetric capacity. This large volume is required to adequately protect passenger 10 and to fill the space between the head/torso region of passenger 10 and instrument panel 110. Because of the large volumetric capacity of head/torso airbag 132 and the short amount of time in which head/torso airbag 132 must become fully inflated, head/torso airbag 132 is typically filled at a high pressure sufficient enough to provide adequate restraint energy, typically between about 13.8 kPa and about 69 kPa. A conventional head/torso airbag such as the passenger airbag shown at 132 is ideal for a normally seated average sized male (50th-percentile). However, the large volumetric capacity and the high pressure used to fill head/torso airbag 132 are not ideal for smaller passengers, such as, for example, children and 5th-percentile or smaller women or children between 3 to 6 year old. Further, passenger 10 may be out of position, for example, passenger 10 may be positioned too close to instrument panel 110 at the time of a collision and the head region of out-of-position passenger 10 may lie within the deployment path of head/torso airbag 132. Head/torso airbag 132 may thus be deployed into the weak neck and head regions of passenger 10. A variety of systems have been developed to minimize the impact of a conventional head/torso airbag for smaller passengers and out-of-position passengers. For example, some systems utilize occupant sensors which turn off the airbag when a small person, such as a 3 to 6 year old child, is sensed. However, such sensors are expensive and complicated. Other methods attempt to reduce the impact force of deployed head/torso airbag 132 on passenger 10. However, such methods may not differentiate between the needs of the average passenger 10 and small or out-of-position passengers.

As is known to those of skill in the art, most passenger restraint systems include an actuation circuit having a crash sensor, such as, for example, an inertia switch or an accelerometer, and a controller. Upon detection of a crash condition requiring protection of passenger 10, as sensed by the crash sensor, the controller directs the actuation circuit to activate the inflator. Such an electronic control unit (not shown) is positioned in vehicle 100.

The electronic control unit in the restraint system disclosed herein is capable of (1) measuring an operational parameter of the automotive vehicle; (2) comparing the measured operational parameter value to predetermined threshold operational parameter values; and (3) initiating deployment of head/torso airbag 132 and/or knee airbag 152 when the measured operational parameter value meets a specified condition. To state in other words, the electronic control unit of the restraint system makes an evaluation and then deploys one of (1) a head/torso airbag by itself, (2) a knee airbag by itself or (3) both a head/torso airbag and a knee airbag.

In one embodiment of the restraint system, the restraint system (1) measures an operational parameter, $V_M$, e.g., speed or deceleration of vehicle 100 and (2) compares the value of the measured operational parameter with two predetermined threshold operational parameter values, $V_1$ and $V_2$. When $V_M$ is less than both $V_1$ and $V_2$, or $V_M<V_1<V_2$, the deployment of both knee airbag 152 and head/torso airbag 130 is suppressed. When $V_M$ is greater than $V_1$, but less than $V_2$, or $V_1<V_M<V_2$, the deployment of head/torso airbag 130 is suppressed and only knee airbag 152 is deployed. When the value of $V_M$ exceeds both $V_1$ and $V_2$, or $V_1<V_2<V_M$, both head/torso airbag 130 and knee air bag 152 are deployed to provide maximum occupant restraint. By suppressing deployment of head/torso airbag 130 in low-speed collisions, the risk is minimized of injury to small or out-of-position passengers. Further, in some instances, the effective passenger restraint system may eliminate the need for an occupant sensor through the use of the electronic control unit that determines whether the collision qualifies as a low-speed collision.

In addition to the vehicle speed, other operational parameters can be measured or identified to assess whether head/torso airbag 132 and/or knee airbag 152 should be deployed. Examples of operational parameters in addition to the vehicle speed which are relevant to the analysis for the driver's side include confirmation that the occupant is using a seatbelt and the identification of the position of the driver. The same operational parameters are relevant to the analysis for the passenger's side. Additionally, sensing the passenger's weight may be an operational parameter which is relevant to the analysis for the passenger's side. Whether the glove box is opened or closed may also be relevant to the analysis for the passenger's side. Electronic control units capable of measuring speed, deceleration, occupant's weight, occupant's position, use of seatbelt, and the use of the glove box, are known to those of skill in the art.

When a knee airbag is deployed in the absence of a head/torso airbag, out-of-position passengers are less likely to be injured by a safety device because deployment of the safety device toward the weak head and neck regions of the passenger is avoided. Rather, the deployment path includes the knee and shin regions of the passenger, which are less prone to injury than the occupant's head and neck region. Also, a knee airbag typically inflates with about ⅕ of the power of a head/torso airbag and with ⅐ of the power of a two-stage head/torso airbag in each of its stages. In addition to preventing contact between passenger 10 and instrument panel 110, a knee airbag can also be used, in some embodiments, to prevent passenger 10 from "submarining" underneath the inflated head/torso airbag 130.

Figure 3:
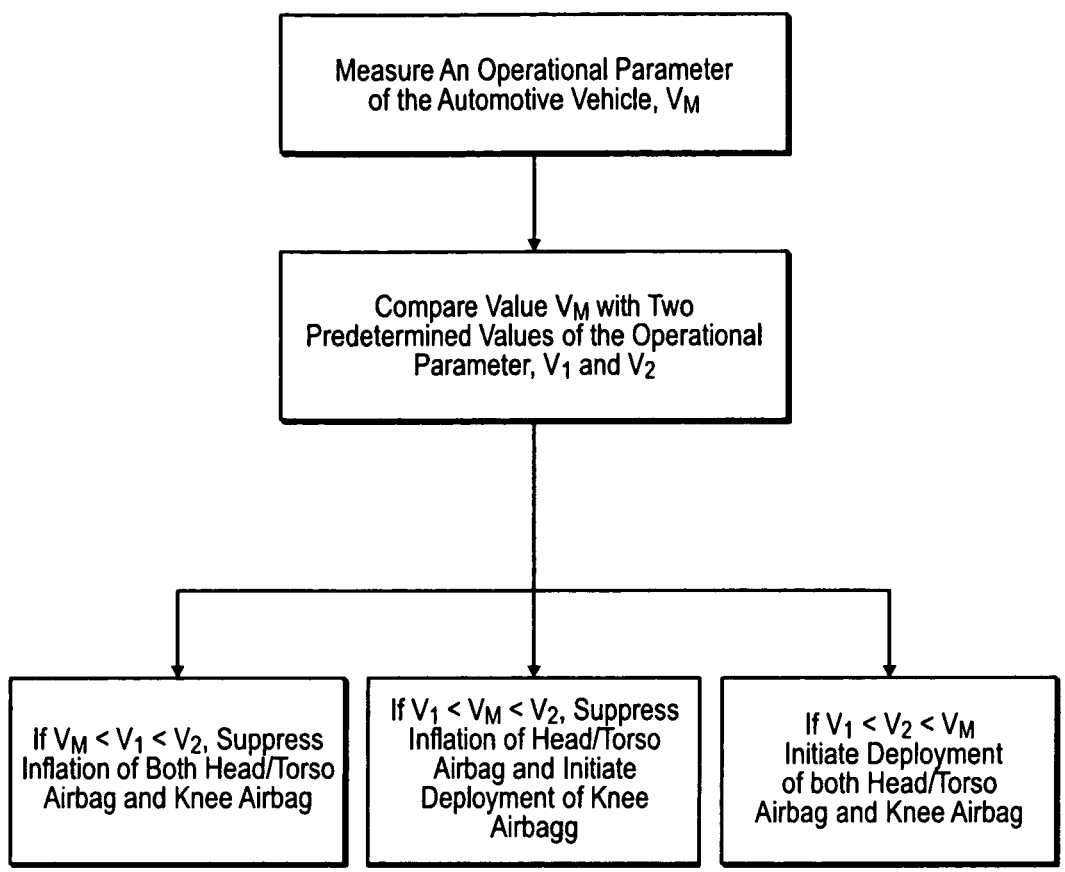
FIG. 3 is a schematic diagram of a restraint system that selects deployment of a head/torso airbag or a knee airbag.

When speed is the measured operational parameter, an exemplary predetermined threshold operational parameter value is between about 12 miles per hour (mph) and about 18 mph. FIG. 3 depicts a schematic of such a system wherein an electronic control unit (1) measures the automotive vehicle's speed which is the operational parameter of the vehicle, (2) compares the value of the measured operational parameter to a first predetermined threshold operational parameter value such as 12 mph, and (3) initiates deployment or inflation of the knee airbag and suppresses deployment or inflation of the head/torso airbag when the value of the measured operational parameter exceeds the value of the first predetermined threshold operational parameter. In such a system, the electronic control unit also compares the measured operational parameter value to a second predetermined threshold operational parameter value such as 18 mph and initiates deployment or inflation of both the head/torso airbag and the knee airbag when the value of the measured operational parameter exceeds the value of the second predetermined threshold operational parameter and suppression of deployment of the head/torso airbag when the value of the measured operational parameter is less than the value of the second predetermined threshold operational parameter.

Figure 4A:
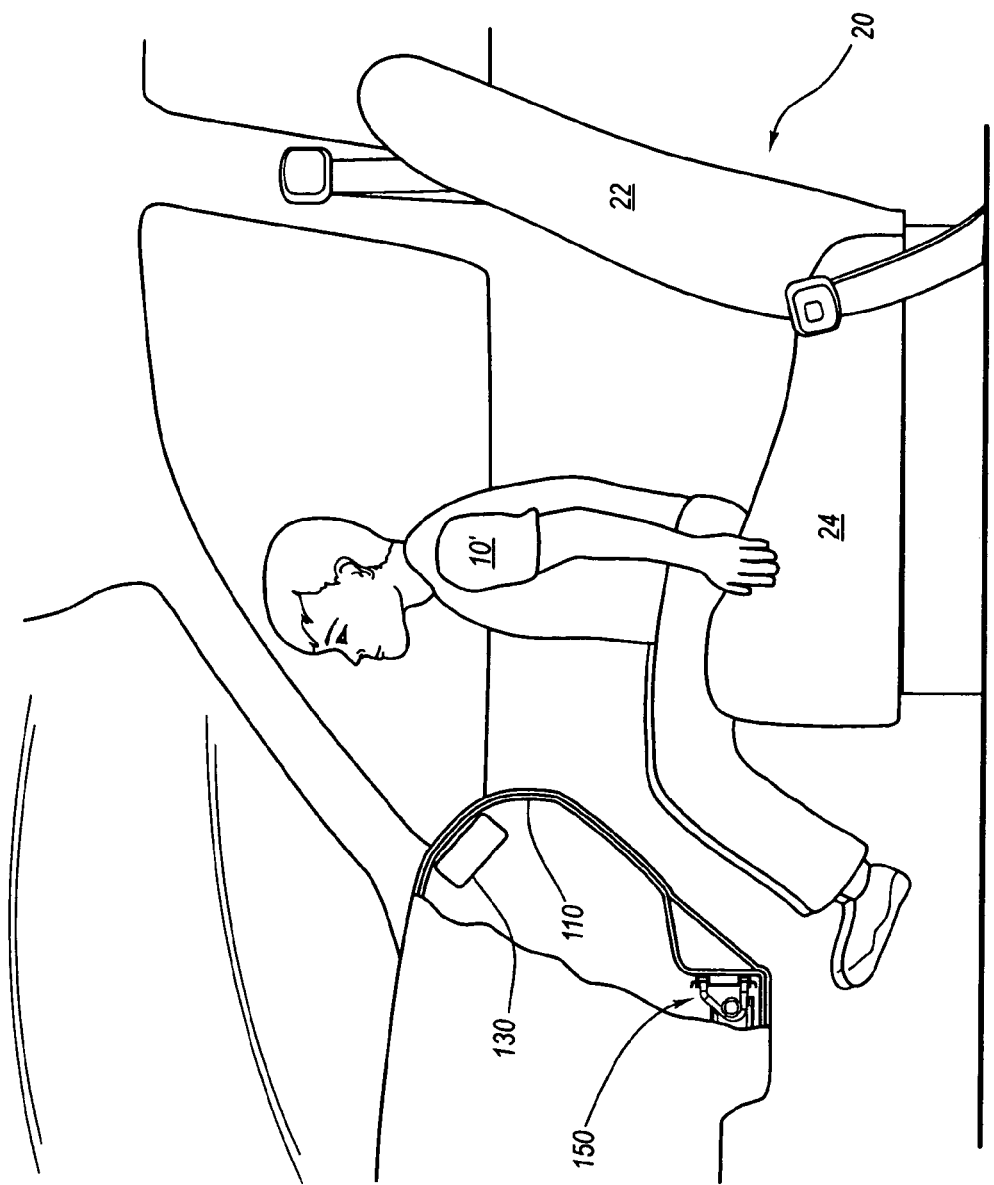
FIG. 4A depicts a child who is out-of-position in a vehicle which has a head/torso airbag and a knee airbag.
Figure 4B:
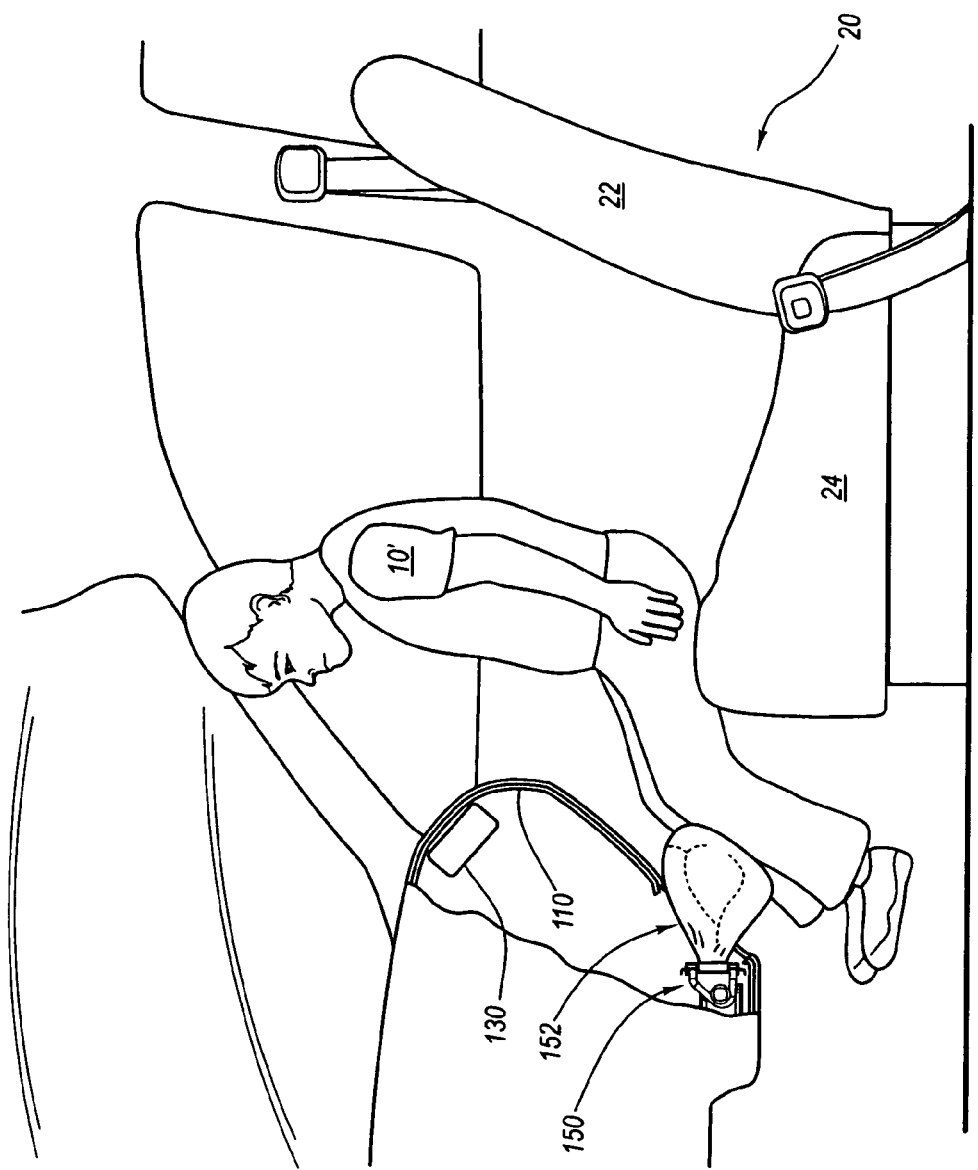
FIG. 4B depicts the initial deployment of the knee airbag.

FIGS. 4A-4D show the sequential deployment of knee airbag 152. A child is shown in FIGS. 4A-4D who is about 3-6 years old and is identified as passenger 10'. Passenger 10' is shown out-of-position on seat cushion 24 in FIG. 4A before a collision. FIG. 4B depicts the initial deployment of knee airbag 152 directed to the lower legs of passenger 10' in an upward path which follows instrument panel 110 and passenger's lower legs.

Figure 4C:
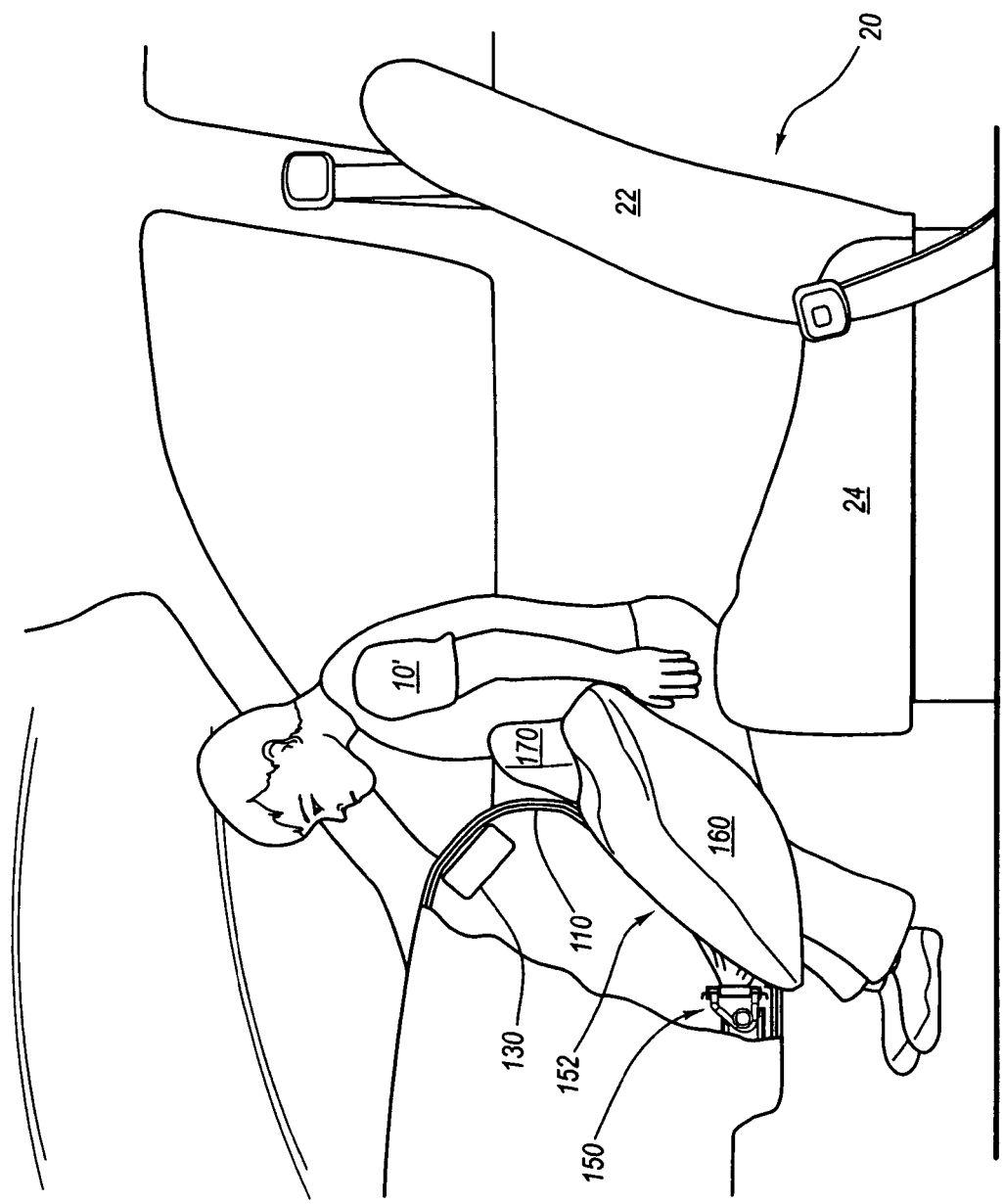
FIG. 4C depicts the deployment of the knee airbag as the upper portion expands and the lower portion of the knee airbag has already expanded.

Knee airbag 152 has two portions, a lower portion 160 and an upper portion 170. FIG. 4C shows lower portion 160 inflated and positioned in front of the thighs of passenger 10'. FIG. 4C also shows upper portion 170 initially expanding. The initial expansion of upper portion 170 causes upper portion to move upward in front of the chest of passenger 10'.

Figure 4D:
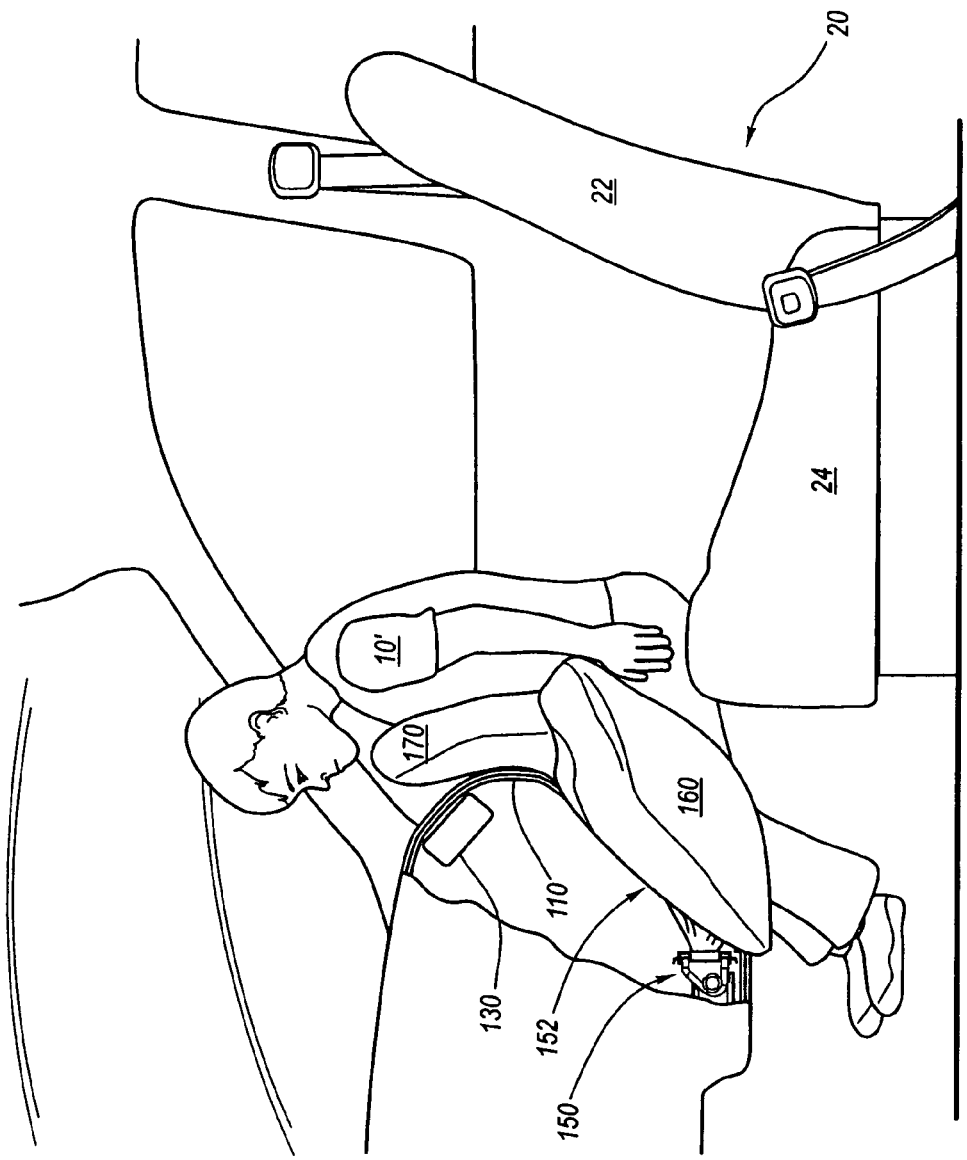
FIG. 4D depicts the completed deployment of the knee airbag.

FIG. 4D shows the completed expansion of knee airbag 152. The fully expanded upper portion 170 extends in front of the chest of passenger 10' and along the instrument panel 110 between the head of the passenger 10' and the instrument panel. Once upper portion 170 extends fully upward the depth of knee airbag 152 may increase slightly as knee airbag is fully expanded. When knee airbag 152 is in an inflated position, lower portion 160 provides knee/upper leg protection for passenger 10', and upper portion 170 provides torso and/or head region protection for passenger 10'.

Figure 5E:
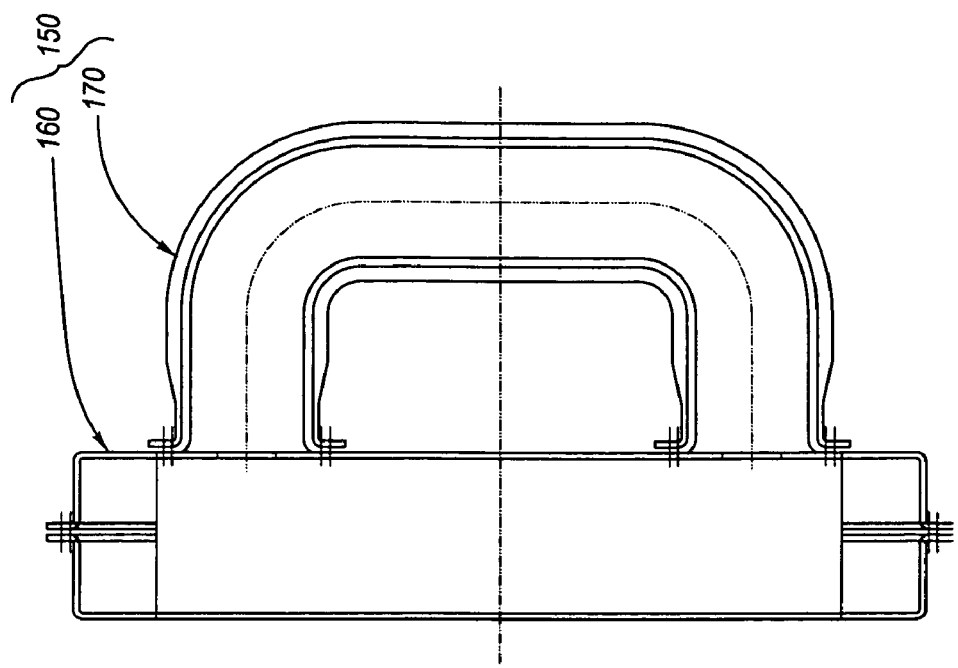
FIG. 5E is a cross-sectional view of the knee airbag of FIG. 5B taken along cutting line 5E-5E.

FIGS. 5A-5E provide more detailed views of knee airbag 152. FIG. 5A shows knee airbag in a partially inflated state and depicts the back 154, or side facing the front of the vehicle and away from the passenger, of knee airbag 152 relative to its position when it is inflated in a vehicle. Back 154 is also shown in FIG. 5B. The front 156, or side facing the rear of the vehicle and toward the passenger, of knee airbag 152 is shown in FIG. 5C. Since front 156 is the side of knee airbag 152 which faces and possibly contacts an occupant, it has minimal surface features. Front 156 and back 154 are also identified in FIG. 4D.

As shown in FIGS. 5A-5D, lower portion 160 has a throat 162 which provides access for the inflation gas into knee airbag 152. More particularly, throat 162 provides access into chamber 168 of lower portion 160. A heat shield is positioned at throat 162 to provide a heat barrier.

Figure 5D:
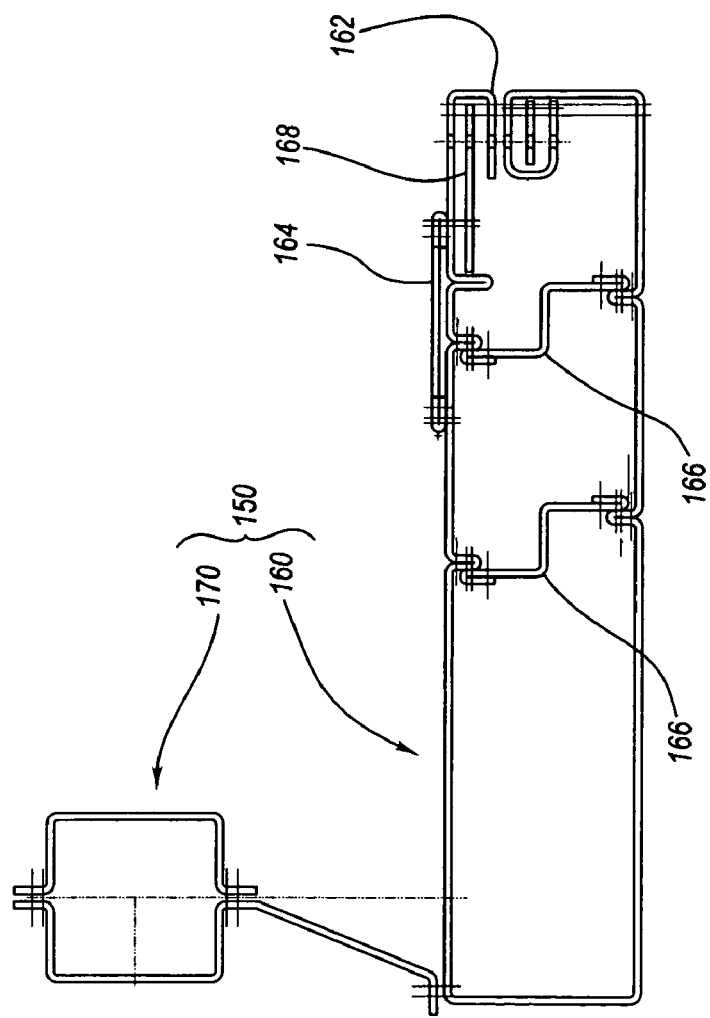
FIG. 5D is a cross-sectional view of the knee airbag of FIG. 5B taken along cutting line 5D-5D.

An external tether is shown in FIGS. 5A, 5B and 5D at 164. External tether 164 assists in controlling the upward expansion of knee airbag 152. FIG. 5D shows external tether 164 and internal tethers 166. The tethers assist in defining the shape of lower portion 160. As shown in the sequential images of FIGS. 5A-5C, it is useful for lower portion 160 and upper portion 170 to have a shallow depth so that the knee airbag 150 can fit between instrument panel 110 and an out-of-position occupant. This relatively shallow depth can be achieved by various structures such as external tether 164 and internal tethers 166. In addition to impacting the shape of knee airbag 152, internal tethers 166 also facilitate rapid inflation of upper portion 170 by directing the inflator gas to the upper portion 170.

FIG. 5A shows upper portion 170 extending from lower portion 160. The upper portion 170 extends at an angle which permits knee airbag 152 to wrap around instrument panel and push upward in between a passenger's chest and instrument panel 110. The angle is essentially perpendicular in FIG. 5A, however, other angles such as less than perpendicular angles can be used. Wrapping around or nesting against instrument panel 110 protects the passenger from impact with the instrument panel during a collision. Upper portion 170 has a back section 172 and a front section 174 which are sewn together to form a U-shaped chamber 178 within upper portion 170. U-shaped chamber 178 has extension segments 176 which are connected by connecting segment 177.

FIG. 5D shows the depth of lower portion 160 while FIG. 5A shows the width of lower portion 160. More particularly, FIG. 5D shows chamber 168 of lower portion 160 and its shape when it is at least partially inflated. Lower portion 160 is relatively wide so that it covers various leg positions within the vehicle's seating space but has a depth which is relatively shallow to permit it to fit in front of an out-of-position occupant.

FIG. 5E shows the fluid communication between chamber 168 and chamber 178. FIGS. 5A and 5D-5E show the configuration of U-shaped chamber 178. The U-shape of chamber 178 assists in the timing of the sequential expansion of knee airbag 152. The U-shape also provides maximum cushioning area with the smallest increase in airbag volume.

As indicated above, knee airbag 152 is one embodiment of a knee airbag capable of use with the passenger restraint system described above. However, the passenger restraint system need not be used with knee airbag 152. Other knee airbags with multiple chambers, one of which protects the head/torso region of passenger 10, may be used. Also, knee airbags that do not protect the passenger's head or torso regions may be used with the passenger restraint system described above including a knee airbag which has a single chamber such as knee airbag 152'. Other knee airbags include those described in U.S. Pat. Nos. 5,513,877 and 4,290,627. When using a knee airbag that does not protect the passenger's head or torso regions, it may be advantageous for the instrument panel laminate to have additional padding, such as foam.

It will be apparent to those having skill in the art that changes may be made to the details of the above-described embodiments without departing from the underlying principles of the invention. In the claims, the conjunction "and" is inclusive, the conjunction "or" is exclusive and the conjunction "and/or" is either inclusive or exclusive. Embodiments of the invention in which an exclusive property or privilege is claimed are defined as follows. Note that elements recited in means-plus-function format are intended to be construed in accordance with 35 U.S.C. §112 ¶6.

The invention claimed is:

1. A passenger restraint system for use in an automotive vehicle, comprising:
   a first inflatable passenger-side restraint cushion that is configured to engage a lower extremity region of a passenger in the automotive vehicle when the first inflatable restraint cushion is in an inflated state,
      wherein the first inflatable passenger-side restraint cushion has a lower portion and an upper portion,
      wherein the lower portion and upper portion each have a chamber and the chambers are in fluid communication,
      wherein the lower portion is shaped to provide knee/upper leg protection for a passenger,
      wherein the upper portion is shaped to provide torso region protection for a passenger, and
      wherein the upper portion and the lower portion are configured such that the lower portion expands before the upper portion upon deployment;
   a second inflatable passenger-side restraint cushion that is configured to engage an upper body region of the passenger when the second inflatable passenger-side restraint cushion is in an inflated state;
wherein the first and second inflatable passenger-side restraint cushions are capable of separate, non-simultaneous inflation; and
an electronic control unit capable of making an evaluation as a condition for selecting deployment of only one of the inflatable passenger-side restraint cushions or both of the inflatable passenger-side restraint cushions and initiating deployment of only one of the inflatable passenger-side restraint cushions or both of the inflatable passenger-side restraint cushions.

2. The restraint system of claim 1, wherein the upper portion of the first inflatable restraint extends from the lower portion in a configuration that permits conformance to an instrument panel of a vehicle and to the transition from the passenger's upper legs to torso.

3. The restraint system of claim 1, wherein the electronic control unit is capable of making an evaluation as a condition for deployment by evaluating the speed of the vehicle, the rate of deceleration of the vehicle, the occupant's use of a seatbelt, the position of the occupant, and/or the occupant's weight.

4. The restraint system of claim 1, wherein the electronic control unit is capable of deploying the first inflatable restraint cushion while suppressing deployment of the second inflatable restraint cushion.

5. The restraint system of claim 1, wherein the electronic control unit is capable of
(1) measuring an operational parameter of the automotive vehicle; and
(2) comparing the measured operational parameter value to a predetermined threshold operational parameter value to make the evaluation as a condition for deployment of at least one of the inflatable restraint cushions.

6. A method of selectively deploying at least one passenger-side airbag comprising:
providing a passenger-side head/torso airbag having an inflated state and an uninflated state, wherein the passenger-side head/torso airbag is configured to engage an upper body region of a passenger in an automotive vehicle when the passenger-side head/torso airbag is in the inflated state;
providing a passenger-side knee airbag having an inflated state and an uninflated state, wherein the passenger-side knee airbag has a lower portion and an upper portion, wherein the lower portion and upper portion each have a chamber and the chambers are in fluid communication, wherein the lower portion is configured to provide knee/upper leg protection of the passenger when the passenger-side knee airbag is in the inflated state, wherein the upper portion is shaped to provide torso region protection for a passenger when the passenger-side knee airbag is in the inflated state, wherein the upper portion and the lower portion are configured such that the lower portion expands before the upper portion upon deployment, wherein the passenger-side knee airbag is capable of inflation separately from and non-simultaneously with inflation of the passenger-side head/torso airbag;
measuring an operational parameter of the automotive vehicle;
comparing a measured operational parameter value to a first predetermined threshold operational parameter value and to a second predetermined threshold operational parameter value;
suppressing deployment of the passenger-side knee airbag cushion and the passenger-side head/torso airbag when the measured operational parameter value is less than the first predetermined threshold operational parameter value and the second predetermined threshold operational parameter value;
initiating inflation of the passenger-side knee airbag cushion and suppressing inflation of the passenger-side head/torso airbag when the measured operational parameter value is greater than the first predetermined threshold operational parameter value but less than the second predetermined threshold operational parameter value; and
initiating inflation of at least the passenger-side head/torso airbag when the measured operational parameter value is greater than the first predetermined threshold operational parameter value and the second predetermined threshold operational parameter value or initiating inflation of both the passenger-side knee airbag and the passenger-side head/torso airbag when the measured operational parameter value is greater than the first predetermined threshold operational parameter value and the second predetermined threshold operational parameter value.

7. The method of claim 6, in which the operational parameter is speed of the automotive vehicle and the value of the first predetermined threshold operational parameter is less than about 12 mph.

8. The method of claim 6, in which the operational parameter is speed of the automotive vehicle and the value of the second predetermined threshold operational parameter is between about 12 mph and about 18 mph.

9. A passenger-side knee airbag comprising:
a lower portion having a throat for receiving an inflation gas into a chamber of the lower portion, wherein the lower portion is shaped to provide knee/upper leg protection for a passenger,
an upper portion having a chamber for receiving the inflation gas from the chamber of the lower portion, wherein the chamber of the upper portion is U-shaped and comprises two extension segments that extend from the lower portion and a connecting segment that connects the two extension segments, wherein the upper portion is shaped to provide torso region protection for a passenger,
wherein the upper portion extends from the lower portion at an angle and the upper portion and the lower portion are positioned relative to each other to permit conformance to an instrument panel of a vehicle and to the transition from the passenger's upper legs to torso, and
wherein the throat into the chamber of the lower portion combined with the configuration of the upper portion enables the chamber of the lower portion to be inflated before the chamber of the upper portion.

10. The airbag of claim 9, wherein the lower portion has at least one tether to maintain a shallow depth.

* * * * *